Aug. 4, 1964   W. FAASCH ET AL   3,143,034
PHOTOGRAPHIC CAMERA
Filed Jan. 22, 1962   2 Sheets-Sheet 1
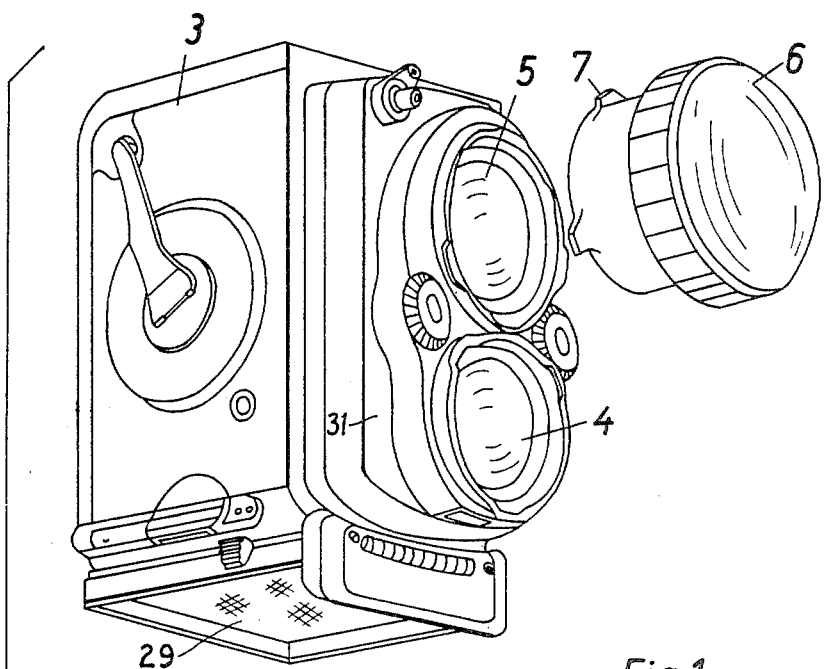
Fig.1
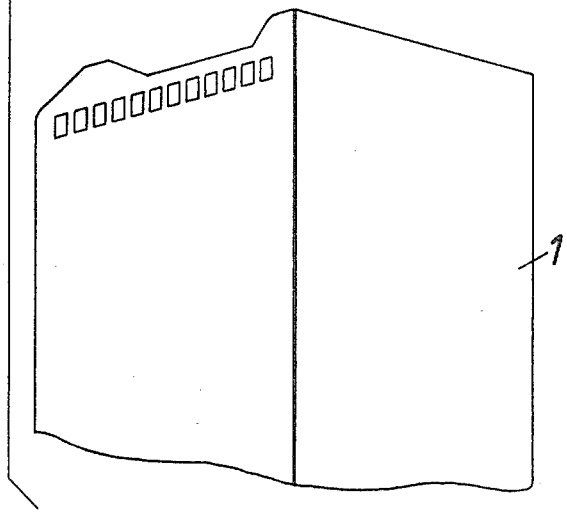

Aug. 4, 1964     W. FAASCH ET AL     3,143,034
PHOTOGRAPHIC CAMERA

Filed Jan. 22, 1962     2 Sheets-Sheet 2

United States Patent Office 3,143,034
Patented Aug. 4, 1964

3,143,034
PHOTOGRAPHIC CAMERA
Werner Faasch, Braunschweig-Bienrode, and Harry Schade, Braunschweig, Germany, assignors to Franke & Heidecke, Fabrik Photographischer Präzisions-Apparate, Braunschweig, Germany, a firm of Germany
Filed Jan. 22, 1962, Ser. No. 167,868
Claims priority, application Germany Feb. 2, 1961
8 Claims. (Cl. 88—24)

This invention relates to a photographic camera, and more particularly to a camera of the type or kind known as a twin lens reflex camera.

It is already known in the art that such a camera may be used with a supplementary illuminating attachment so designed that picture slides or transparencies may be projected onto a viewing screen by the use of the viewfinding optical system of the camera. An example of this is disclosed in the United States patent application of Karl Schiele, Serial No. 75,822, filed December 14, 1960, now U.S. Patent No. 3,056,333, issued October 2, 1962, the Schiele application and the present application both being beneficially owned by the same owner.

An object of the present invention is the provision of simple and effective means whereby the camera can be used for duplicating or reproducing the slide or transparency which is being projected through the viewfinder system of the camera.

Another object is the provision of supplementary or accessory lens means so designed that when the slide or transparency projected through the viewfinder chamber is properly focused on a viewing screen, the image on the viewing screen will at the same time be properly focused on the film in the picture-taking chamber of the same camera.

A further object is the provision of means in the form of a supplementary or accessory lens, for producing synchronism between the viewfinder lens system when used as a projector lens, and the exposure or picture-taking lens system when used to make a slide-duplicating picture, notwithstanding the fact that the initial normal synchronism between these two systems has necessarily been destroyed or disturbed by the use of the finder lens system for projection purposes.

A still further object is the accomplishment of these purposes by means which do not in any way detract from the normal usefulness of the twin lens reflex camera for normal picture-taking purposes when the supplementary or accessory lens is removed from it and when the camera is removed from the special illuminating means employed for projection purposes.

These and other desirable objects may be attained in the manner disclosed as an illustrative embodiment of the invention in the following description and in the accompanying drawings forming a part hereof, in which:

FIG. 1 is an exploded perspective view of a fragment of the special illuminating means, and the camera itself in inverted position ready to be applied to the illuminating means, and the supplementary or accessory lens in position to be applied to the camera;

The present invention is applicable to any suitable make or kind of twin lens reflex camera. Merely as a typical example of a camera suitable for purposes of the present invention, there may be mention of the "Rolleiflex" camera manufactured by the firm of Franke & Heidecke, in Braunschweig, Germany, and widely known and used throughout the United States and elsewhere. Those skilled in the art are well familiar with such cameras as well as other makes of twin lens reflex cameras, but those who are not already familiar with the "Rolleiflex" camera may consult the prior literature referred to in United States Patents 2,926,572, dated March 1, 1960, and 2,963,950, dated December 13, 1960, and 2,981,166, dated April 25, 1961.

Figure 2:
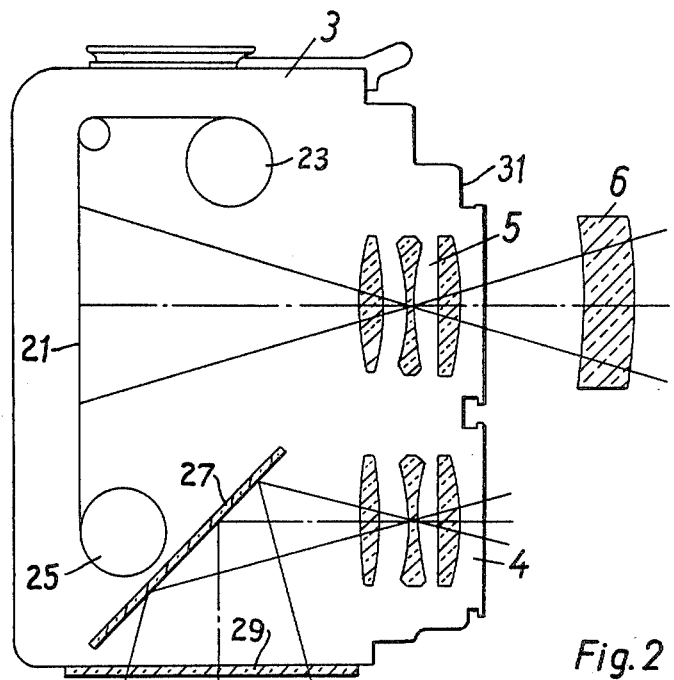
FIG. 2 is a schematic view of the camera applied to the illuminating means used for projection purposes, showing the projection optical system and the picture-taking optical system with a supplementary lens according to the invention.
Figure 3:
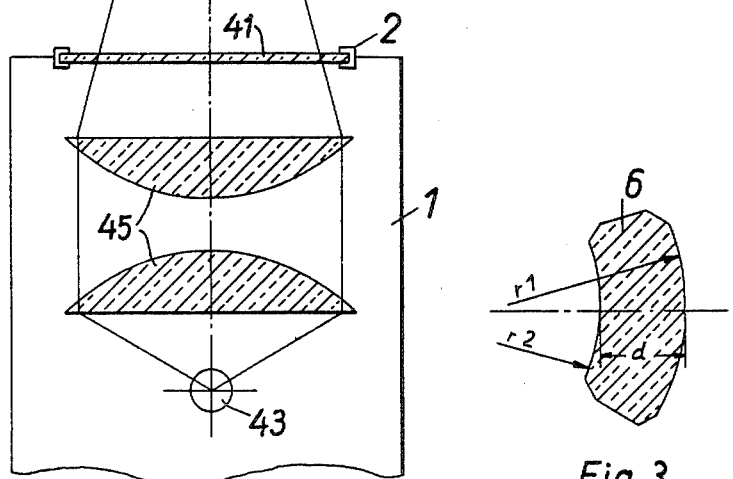
FIG. 3 is a schematic axial section taken diametrically through a supplementary lens according to one embodiment of the invention.

In twin lens reflex cameras, there is a camera body, indicated in general at 3 in the accompanying drawings, having a viewfinder lens 4 near the top of the front wall of the camera, and a picture-taking lens 5 near the bottom of the front wall, when the camera is held in its normal erect position for normal picture-taking purposes. These "top" and "bottom" positions are reversed in FIGS. 1 and 2, because the camera is here shown in the inverted position which it occupies when used as a projector.

At the bottom of the camera is the picture-taking or exposure chamber, at the back of which is the focal plane where the film 21 is held in position to be exposed to rays of light entering through the picture-taking lens 5, successive unexposed portions or "frames" of film being drawn from the film supply roll 23 and wound up on the take-up roll 25. In the upper part of the camera body (or lower part when it is in the inverted position shown in FIGS. 1 and 2) there is the usual view-finder chamber, separated from the picture-taking chamber by an opaque partition (not shown in FIG. 2, but well understood in the art) and having an inclined reflecting surface 27 therein so that light entering through the finder lens 4 is reflected upwardly by the reflecting surface or mirror 27 and forms an image on the viewfinding or focusing screen 29, of ground glass or other suitable diffusing surface, located at the top of the camera and normally shaded by a removable focusing hood of conventional type.

In the typical twin lens reflex camera, the two lenses 4 and 5 are of the same focal length ("equivalent focal length" being intended when speaking broadly of "focal length") and both are mounted on a camera front member or lens board 31 which is moved forwardly and backwardly in the direction of the optical axis, for purposes of focusing. It is well understood in the art that the picture-taking chamber and the viewfinder chamber are of such dimensions and proportions that when the image of an object in front of the camera is sharply focused on the screen 29, the image of the same object will also be sharply focused on the film 21, whenever the shutter (not shown) controlling passage of light through the lens 5 is open. To take a picture of an object at a different axial distance in front of the camera, the conventional focusing knob is turned to shift the front member 31 forwardly or backwardly, as the case may be, until the image of the new object appears sharply focused on the screen 29, and then it is known that the image of the new object will be properly focused on the film, when the shutter is opened to make an exposure.

In a typical camera of a kind commercially available on the market, the lenses 4 and 5 each have a focal length of, for example, 75 mm. When the camera front member 31 is in its extreme rearward position (that is, closest to the film) the camera is focused for objects at infinity. For a lens of 75 mm. focal length, the camera front member 31 ordinarily has a range of travel limited to about 6.1 mm. forwardly from its infinity-focused position, and in its extreme forward position, the lenses will be focused on an object at an axial distance of about 1 meter in front of the camera. Objects at closer distances cannot be brought into focus without using supplementary or accessory lenses.

The dimensions given above by way of example are those which apply to the camera when used for normal picture-taking purposes. When the camera is to be used as a projector, however, as disclosed in the above mentioned patent application, Serial No. 75,822, now U.S. Patent No. 3,056,333, issued Oct. 2, 1962, then the focusing hood is removed from the camera, the focusing screen 29 is either removed entirely or is swung back on hinges to an effective or out-of-the-way position, the camera is turned upside down or inverted, and is placed on a supplementary illuminating unit indicated in general at 1 in FIGS. 1 and 2 of the present drawings. At the top of the illuminating unit 1 is a frame or holder 2 slideable horizontally, for holding the slide or transparency 41 which is to be projected. The illuminating unit 1 contains a suitable light source 43, and a condenser lens system 45, for providing brilliant illumination for the slide or transparency 41. The light from this transparency then passes through the viewfinder chamber, but in a reversed direction to the normal direction of passage of the light. That is, the light from the transparency passes first to the mirror 27, and is reflected thereby to pass forwardly through the viewfinder lens 4 and out through the front of the camera, falling upon a viewing screen so that the image of the slide 41 is projected onto and seen on the viewing screen.

The use of the camera as a projector, in the manner above briefly described and as disclosed also in the above mentioned patent application, Serial No. 75,822, now U.S. Patent No. 3,056,333, issued Oct. 2, 1962, necessarily destroys the normal synchronism or conformity between the picture-taking optical system and the viewfinder optical system, for the reason that, as a practical matter, the transparency 41 cannot occupy exactly the same position normally occupied by the focusing screen 29, but must be somewhat spaced from the normal position of the focusing screen, therefore being somewhat farther away (in an optical sense) from the viewfinder lens 4. Because the synchronism between the two optical systems has been disturbed, the picture-taking portion of the camera cannot be properly focused on a screen on which the image of the slide or transparency 41 is focused, and therefore the picture-taking or exposure chamber of the camera cannot be used for taking a picture of the image on the screen, in order to reproduce or duplicate the slide or transparency.

This will perhaps be clearer if we consider an actual example. Suppose the camera has the same typical dimensions already mentioned above, and suppose that the supplementary illuminating unit 1 and the parts connecting or mounting the camera body 3 on the supplementary unit are so constructed that the slide or transparency 41, when in projection position, is spaced 6.1 mm. from the normal position of the screen 29 (the screen meanwhile having been moved to an out-of-the-way position, of course). Now if the lens carrier or camera front member 31 is in its extreme rearward position, the picture-taking lens system will be focused at infinity, but the viewfinder lens system will focus an image of the slide 41 on an image plane or viewing screen at a distance of 1 meter in front of the camera.

On the other hand, if the focusing knob is turned to move the camera front member 31 forwardly to its extreme forward position, so as to focus the picture-taking lens 5 on the screen at a distance of 1 meter, then the projected image of the slide 41 will no longer be sharply focused on the screen at one meter but will now be focused on an image plane at about 44 or 45 centimeters in front of the camera. Thus it is seen that no matter what the position of the camera front member 31, there is no longer synchronism or conformity between the two lens systems with respect to focusing the film 21 on the one hand, or the slide or transparency 41 on the other hand, simultaneously for the same object distance, and thus it is impossible to use the picture-taking chamber of the camera for taking a picture of an image projected on the screen through the viewfinding chamber, in order to make a reproduction or duplicate of the slide.

The present invention is designed to overcome this difficulty, and to re-establish the necessary synchronism or conformity, so that the camera can, in fact, be used for projecting a slide onto a screen and for taking a picture of the projected image of the slide, in order to duplicate or reproduce the slide. According to the present invention, this is accomplished by providing a supplementary or accessory lens either for the picture-taking objective or for the viewfinder objective, or for both, the supplementary lens or lenses having characteristics just sufficient to correct the above mentioned condition and to restore or re-establish the synchronism or conformity between the two lens systems so that when the image of a slide is projected through the viewfinder objective and sharply focused on a receiving surface (viewing screen) in front of the camera, the film in the picture-taking chamber of the camera will be in proper sharp focus position with respect to the same viewing screen, enabling the taking of a picture of the image of the slide, and thus enabling the duplication of the slide. Stating it another way, the supplementary lens system of the present invention is so designed that for a given pre-selected screen distance, the respective conjugate focal distances of the two objectives on their respective sides toward the viewing screen is the same, even though their respective conjugate focal distances on their other sides (toward the film or toward the transparency, respectively) are different. In determining the conjugate focal distances, due allowance must be made not only for the change in equivalent focal length caused by the supplementary lens system, but also for the shift in the "principal points" from which the conjugate focal distances are measured.

So far as now known, the use of a supplementary lens or lenses to accomplish this purpose is a broadly new concept, and it is a new concept to use a twin lens reflex camera for projecting an image of a slide through the viewfinder lens system of the camera onto a screen or other suitable receiving surface, and simultaneously taking a picture of the projected image of the slide through the picture-taking lens system of the camera.

One form of the present invention comprises the supplementary lens 6 held in a mount 7 of the bayonet type and adapted to be mounted on or detached from the mount of the picture-taking lens 5 by the usual combination of axial movement and twisting or rotary movement. For best results, the supplementary lens is designed for use with a particular screen spacing (distance from the camera to the screen onto which the image of the transparency is projected). Thus if a screen distance of one meter is selected, a supplementary lens having a power of one diopter can be used in front of the exposure lens of the camera, and will achieve synchronism when the camera front member is positioned at its rearward limit or infinity-focused position. As already explained, the projected image of the transparency will be focused on the screen at a distance of one meter, and now with the supplementary lens having a power of one diopter the image on the screen will be focused on the film plane 21.

If the camera front 31 is now moved to its forward limit of motion, the plane of the projected image of the transparency will be brought closer, to a distance of about 45 cm. in front of the camera, but the exposure objective (including the supplementary lens) will be focused at a distance of approximately 50 cm. If critically sharp reproductions are not needed, this difference may not be seriously detrimental. Also, masking may be used to improve the situation where accurate conformity no longer exists because the screen is no longer at the spacing on which the lens calculations were based.

The use of the supplementary lens system not only changes the effective focal length of the objective with which the supplementary lens is used, but also displaces the "principal point" of the objective. The combined effect is that there may be a difference in scale between the two objective lens systems (viewfinder objective and exposure objective) of as much as 10% or even more. This change in scale can be compensated for by using a magnifying or reducing telescope system, e.g., a magnifying system in front of the exposure objective or a reducing system in front of the viewfinder objective, or a combination of the two, so that, considered as a whole, the arrangement can be used with deviations within only slight limits, for a specific projection screen spacing.

As an illustrative example of a simple form of supplementary lens according to the invention, the supplementary lens may be a single element meniscus of comparatively large thickness. For a magnification factor of 1.14 and an image screen spacing of 1 meter, with a camera focal length of 75 mm., and using glass with a refractive index N of 1.522, this meniscus may have the following dimensions.

*Example 1*

$r_1 = 41.7$ mm.  $r_2 = 39.7$ mm.  $d = 16.3$ mm.

*Example 2*

$r_1 = 26.5$ mm.  $r_2 = 24.45$ mm.  $d = 10.0$ mm.

In the light of the foregoing theoretical discussion and of the specific examples given, those skilled in the art will now be able to construct a wide variety of supplementary lenses or lens systems for accomplishing the purposes of the invention when using cameras of various different focal lengths and when placing the screen at various different distances or spacings from the camera. It will now be apparent to those skilled in the art that, if required, cemented or multi-lens systems can be used, which have the property of a magnifying telescope system (for use in front of the exposure objective) or a reducing system (for use in front of the viewfinder objective). Such skilled persons will also see that a simple supplementary lens for changing the focal length of the projection system may be used in front of the viewfinder objective which serves as the projection lens, while a telescope system for changing the focal length is used in front of the exposure objective, in order to achieve identity between the scales of the transparency and of the exposed duplicate or reproduction thereof as made in the exposure chamber.

What is claimed is:

1. A supplementary optical system for a twin-lens mirror reflex focusing camera having a film-containing exposure chamber and an associated exposure objective for projecting an image of an external object onto the film in the exposure chamber and having a viewfinder chamber with a movable focusing screen normally positioned at a fixed location and an associated viewfinder objective for projecting an image of the same external object onto the focusing screen, said two objectives being simultaneously movable axially conjointly for focusing both of them jointly on objects at different object distances, said camera being usable as a projector by moving the focusing screen to an out-of-the-way position and by providing a holder for holding a transparency in a projection position parallel to and spaced from the normal position of the screen and a light source for illuminating the transparency so that light rays therefrom are projected through the viewfinder chamber and viewfinder objective onto a receiving surface spaced in front of the camera, said supplementary optical system comprising means for altering the focusing relationship of the two objectives to each other to such an extent that when an image of a transparency is properly focused on a receiving surface at a predetermined distance from the camera, the image on the receiving surface will be properly focused by the exposure objective onto the film in the exposure chamber, thereby enabling the exposure chamber of the camera to be used for a new exposure duplicating the transparency which is simultaneously being projected through the viewfinder chamber.

2. A construction as defined in claim 1, in which said supplementary optical system comprises a meniscus lens of comparatively large thickness mounted in front of and axially alined with one of said objectives.

3. A construction as defined in claim 1, in which said supplementary optical system comprises a meniscus lens of comparatively large thickness mounted in front of and axially alined with one of said objectives, said lens being of glass having a refractive index of substantially 1.522 and having its rear face concave toward the camera with a radius of substantially 41.7 mm. and its front face convex toward the front with a radius of substantially 39.7 mm. and having an axial thickness between its said front and rear faces of substantially 16.3 mm.

4. A construction as defined in claim 1, in which said supplementary optical system comprises a meniscus lens of comparatively large thickness mounted in front of and axially alined with one of said objectives, said lens being of glass having a refractive index of substantially 1.522 and having its rear face concave toward the camera with a radius of substantially 26.5 mm. and its front face convex toward the front with a radius of substantially 24.45 mm. and having an axial thickness between its said front and rear faces of substantially 10.0 mm.

5. In the art of photographic projection and reproduction, the combination of:

(a) a camera of the twin lens reflex type having an exposure objective and a viewfinder objective of substantially identical focal length mounted in fixed relation to each other for conjoint axial focusing movement, an exposure chamber for containing sensitized film onto which an image of an external object is projected by the exposure objective, a viewfinder chamber, and a movable focusing screen normally in fixed relation to said viewfinder chamber and normally in such position relative thereto that when an image of an external object is properly focused on the sensitized film as aforesaid, an image of the same external object will be projected by the viewfinder objective onto and properly focused on said focusing screen, said focusing screen being movable from its said normal position to an out-of-the-way position with respect to light rays projected by said viewfinder objective; and (b) means for illuminating a transparency and for holding the illuminated transparency in a projection position parallel to and spaced from said normal position of said focusing screen at a greater optical distance from said viewfinder objective than the normal optical distance of the focusing screen therefrom, so that light from the illuminated transparency will pass (when the focusing screen has been moved to an out-of-the-way position) into the viewfinder chamber of the camera and be projected through said viewfinder objective to a receiving surface in front of the camera, the normal synchronism of focusing through the exposure objective and the viewfinder objective being no longer applicable with respect to the illuminated transparency and the film, respectively, because the optical distance from the illuminated transparency to the viewfinder objective, while the camera is being used as a projector, is greater than the optical distance from the sensitized film to the exposure objective; and (c) supplementary optical means detachably mounted in front of at least one of the two camera objectives for altering the relationship of their respective focal lengths to each other to an extent sufficient to restore focusing synchronism through the two objectives with respect to a receiving surface at a predetermined distance in front of the camera, to that while the viewfinder chamber of the camera is being used to project an image of an illuminated transparency onto such receiving surface, the exposure chamber of the camera may be used to expose the film to a properly focused image of the image projected onto the receiving surface through the viewfinder chamber, thereby to make a substantial duplicate of the illuminated transparency.

6. A construction as defined in claim 5, wherein said supplementary optical means includes means for correcting any difference in scale, so that the image projected onto the film by the exposure objective will be at the same scale as the illuminated transparency whose image is projected through the viewfinder objective onto the receiving surface.

7. The combination as defined in claim 5, wherein said supplementary optical means in subdivision (c) of claim 5 has only a single lens system in front of only one of the objectives of the camera, no supplementary lens system being used in front of the other objective.

8. The combination as defined in claim 5, wherein said supplementary optical means in subdivision (c) of claim 5 has only a single lens of relatively thick meniscus form in front of the exposure objective, no supplementary lens being used in front of the viewfinder objective.

References Cited in the file of this patent

UNITED STATES PATENTS

| | | |
|---|---|---|
| 1,593,786 | Worthington | July 27, 1926 |
| 1,934,561 | Rayton | Nov. 7, 1933 |
| 2,459,418 | Ellis | Jan. 18, 1949 |
| 2,744,444 | Breitman | May 8, 1956 |